W. SHEPHERD.
CONVERTIBLE BODY FOR ROAD VEHICLES.
APPLICATION FILED JUNE 21, 1916.
1,287,117.
Patented Dec. 10, 1918.
3 SHEETS—SHEET 3.
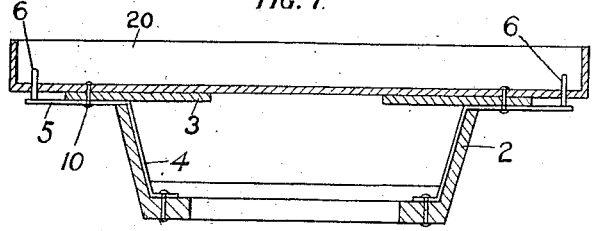
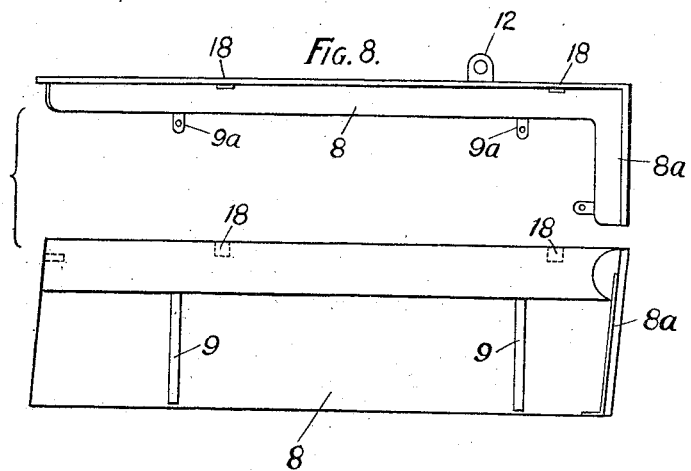

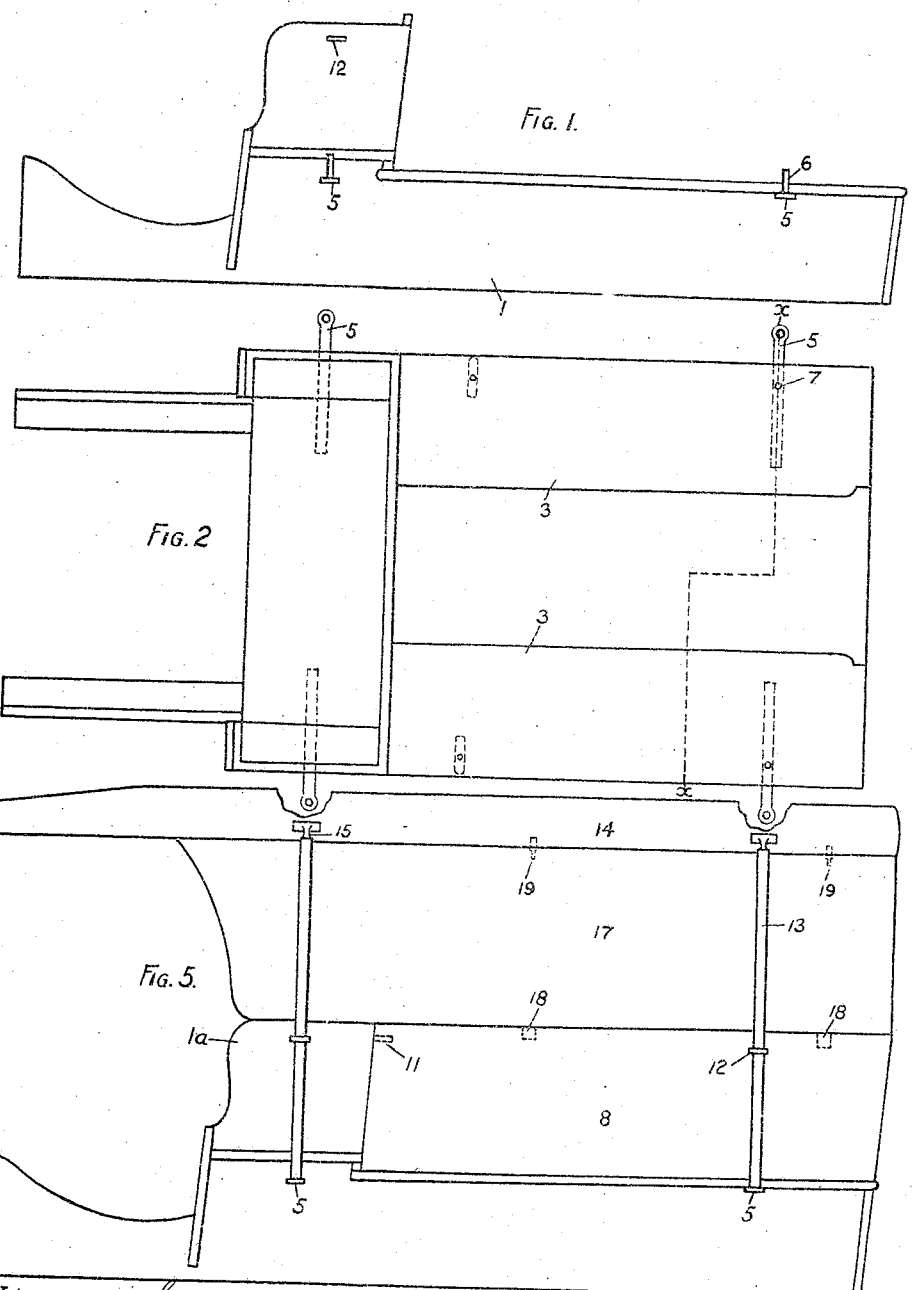

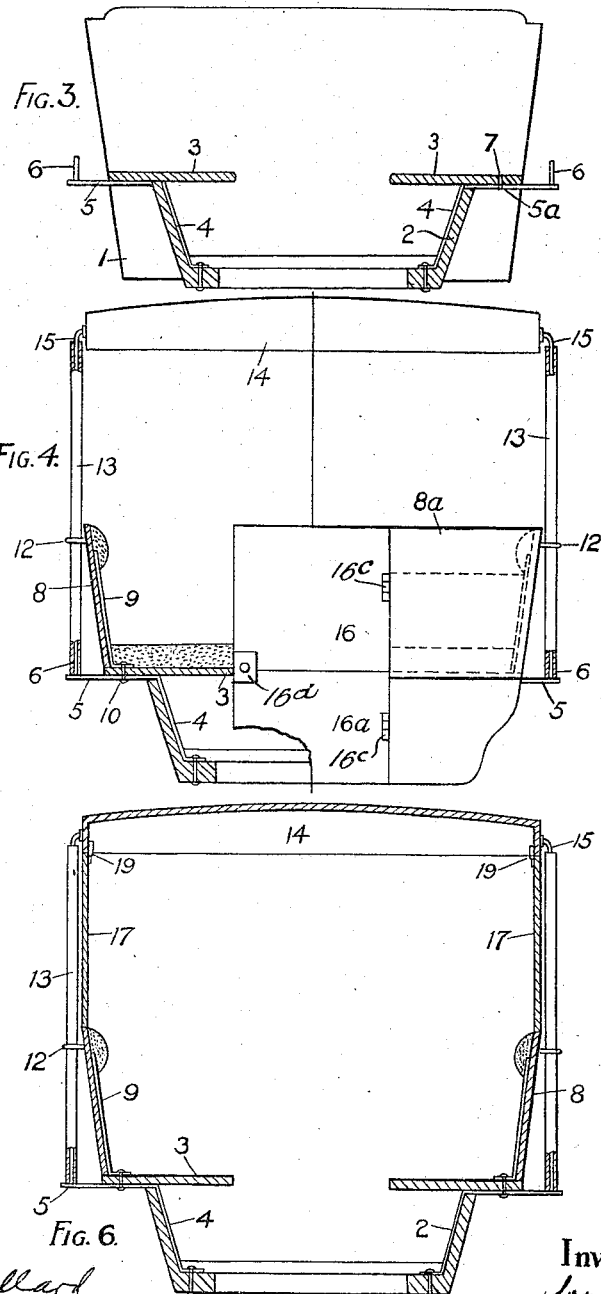

UNITED STATES PATENT OFFICE.

WALTER SHEPHERD, OF MARKET BOSWORTH, ENGLAND.

CONVERTIBLE BODY FOR ROAD-VEHICLES.

1,287,117.  Specification of Letters Patent.  Patented Dec. 10, 1918.

Application filed June 21, 1916. Serial No. 104,970.

*To all whom it may concern:*

Be it known that I, WALTER SHEPHERD, a subject of Great Britain, and residing at the Dixie Hotel, Market Bosworth, in the county of Leicester, England, have invented certain new and useful Improvements in Convertible Bodies for Road-Vehicles, of which the following is a specification.

This invention relates to convertible bodies for road vehicles and comprises improvements which enable the vehicle to be easily and quickly converted, the base of the body being fixed and forming the foundation for the different kinds of vehicles.

Referring to the accompanying drawings:—

Figure 1 is a side elevation of the fixed body part of the vehicle which forms the base structure for the different kinds of vehicles.

Fig. 2 is a plan of the same.

Fig. 3 is a cross section on line $x.x.$ of Fig. 2.

Fig. 4 is a part cross section and end elevation when converted into a passenger vehicle.

Fig. 5 is a side elevation when arranged as a delivery van.

Fig. 6 is a cross section thereof.

Fig. 7 is a cross section when the vehicle is arranged as a dray or lorry.

Fig. 8 represents one of the seat backs or sides in plan and elevation.

The body 1 of the vehicle comprises a longitudinal part 2 carrying integral or permanently secured seats 3 along the upper part thereof. The said seats need not be continuous but may take the form of separate sections arranged at suitable distances apart. On the insides of the body-part 2 are fixed angle irons or brackets 4 terminating at the upper end in outwardly bent arms 5 which extend under the seats 3 and which are provided with eyes $5^a$ and studs 6, the eyes coinciding with openings 7 in the said seats.

For a passenger vehicle as shown in Fig. 4, the seat backs or sides 8 are detachably secured to the seats 3, these seat backs or sides being fitted on the inside with angle irons 9, the lower inturned arms of which are pierced with eyes $9^a$ placed over the eyes $5^a$ in the arms or brackets 5 secured to the body part 2. Bolts 10 are then passed through the eyes $5^a$ in the arms 5 and openings 7 in the seats and drawn up by nuts.

The seat backs or sides 8 in the present construction carry end sections $8^a$ extending partly across the back of the vehicle. The front ends of the seat backs or sides are secured by a carriage lock or other fastening 11 to the front of the body. The seat backs or sides 8 and fixed seat sides $1^a$ have apertured stays 12 projecting from the outside thereof to receive vertical rods 13 which are carried by the studs 6 and support the roof 14, the latter having pins 15 engaging the upper ends of the rods 13, the interengaging ends being cottered if necessary. The rear door 16 to the vehicle is in two parts, one part being hinged as shown at $16^c$ to the body part 2 of the vehicle and the other part to the end section $8^a$ of the seat back or side 8, the two parts, however, being connected together by a spring bolt or catch, $16^d$.

To convert the vehicle for use as a delivery van as shown in Figs. 5 and 6, vertical or substantially vertical side boards 17 are edgewise fitted upon the seat backs or sides 8, the lower edges of the sideboards 17 having studs engaging slots 18 in the upper edges of the seat backs or sides. The upper parts of the sideboards 17 have spring bolts or catches 19 which engage slots in the sides of the roof 14, the latter being supported by the vertical rods 13 as aforesaid. The back of the roof may be provided with hooks or the like on which a back door is swingably mounted and which can be swung open and supported by a stay to provide access to the vehicle.

The seat backs or sides 8 and side boards 17 may be formed integrally instead of in separate members as shown. The sideboards 17 may be replaced by side members having windows for use in a passenger vehicle.

To convert the vehicle into a dray, hearse, lorry, or the like, the seat backs or sides 8, upper part of rear door 16 and roof 14 are detached and a lorry body 20, or it may be a hearse, or dray body, or the like, pierced with openings for bolts is placed upon the seats 3 and over the studs 6 and secured by the bolts 10 to the outwardly turned arms or brackets 5 of the body part 2 as previously described. A carriage lock fixes the bottom part $16^a$ of the door 16 when being used for a dray or lorry.

What I do claim as my invention and desire to secure by Letters Patent, is—

1. A convertible road vehicle comprising a fixed vehicle body, angle irons fixed to the sides thereof terminating at their upper ends in outwardly bent arms, seats bolted to said arms and seat backs fitted on the inside with angle irons having, at their lower ends, inturned arms bolted to the outturned arms of the seat supporting angle irons.

2. A convertible road vehicle comprising a fixed vehicle body having seats along the sides thereof, detachable backs for said seats having end sections extending partly across the rear of the vehicle, means for detachably securing the seat backs to the vehicle body, a rear door for the vehicle body, made in two parts, one part being hingedly carried by the vehicle body and the other part by the end section of one of the seat backs, and means for separably connecting the two parts together.

3. A convertible road vehicle comprising a fixed vehicle body having seats along the sides thereof, detachable backs for said seats, a vehicle top, including a roof, side boards detachably connected to the roof and seat backs, vertical rods carried by the vehicle body and supporting said roof, and apertured stays for the seat backs and vehicle body to receive the rods.

4. A convertible road vehicle comprising a fixed vehicle body having seats along the sides thereof, detachable backs for said seats, a vehicle top, including a roof, side boards detachably connected to the roof and seat backs, vertical rods carried by the vehicle body and supporting said roof, and apertured stays for the seat backs and vehicle body to receive the rods, said side boards being fitted edgewise upon the seat backs and having at their lower edges studs engaging in slots in the upper edges of the seat backs and having at their upper parts releasable locks engaging with corresponding keepers in said roof.

In testimony whereof I have signed my name to this specification in the presence of two subscribing witnesses.

WALTER SHEPHERD.

Witnesses:
GEORGE T. MILLARD,
SETH SADLER.

Copies of this patent may be obtained for five cents each, by addressing the "Commissioner of Patents, Washington, D. C."